United States Patent [19]

Castrec et al.

[11] Patent Number: 4,499,046
[45] Date of Patent: Feb. 12, 1985

[54] MACHINE FOR MONITORING NUCLEAR REACTOR EQUIPMENT AT ITS STORAGE STATION

[75] Inventors: Yves-Marie Castrec, Nanterre; Jean-Pierre Launay, Marly Le Roi, both of France

[73] Assignee: Framatome & Cie., Courbevoie, France

[21] Appl. No.: 321,513

[22] Filed: Nov. 16, 1981

[30] Foreign Application Priority Data

Dec. 5, 1980 [FR] France ................. 80 25865

[51] Int. Cl.³ .................................. G21C 17/00
[52] U.S. Cl. ....................... 376/245; 376/249
[58] Field of Search ................ 376/245, 252, 249

[56] References Cited

U.S. PATENT DOCUMENTS

| | | | |
|---|---|---|---|
| 3,901,090 | 8/1975 | Akey et al. | 376/245 |
| 3,930,942 | 1/1976 | Thome | 376/245 |
| 3,988,922 | 11/1976 | Clark et al. | 376/249 |
| 4,217,173 | 8/1980 | Jabsen | 376/249 |
| 4,298,054 | 11/1981 | Adamowski | 376/245 |
| 4,311,556 | 1/1982 | Iwamoto et al. | 376/249 |
| 4,384,489 | 5/1983 | Crutzen et al. | 376/249 |

Primary Examiner—Sal Cangialosi
Attorney, Agent, or Firm—Pollock, Vande Sande & Priddy

[57] ABSTRACT

Machine for monitoring internal equipment of a nuclear reactor, when stored outside the reactor vessel in the swimming pool of the reactor, comprising a first longitudinal carriage (16) movable on rails (14) on the bottom of the swimming pool, a transverse beam (46) movable on the first carriage (16), a second transverse carriage (61) bearing monitoring instruments (65) and movable on the beam (46), and an arrangement for moving the beam (46) in predetermined steps on the first carriage (16), and the second carriage (61) on the beam (46).

2 Claims, 11 Drawing Figures

MACHINE FOR MONITORING NUCLEAR REACTOR EQUIPMENT AT ITS STORAGE STATION

FIELD OF THE INVENTION

The present invention concerns a machine for monitoring internal equipment of a nuclear reactor, when stored in the swimming pool of the reactor. It is more particularly applicable to ultrasonic monitoring of the upper plate of the core.

BACKGROUND

Above the fuel assemblies in the vessel of a pressurized water nuclear reactor, there is a set of internal equipment, often termed "upper internals", which comprises an upper support plate and a lower plate connected by spacer columns. Between the two plates there are also guide tubes for control clusters which are suspended from the upper support plate, and which rest on the lower plate on which they are held by resilient pins. The lower plate, which also constitutes the upper plate of the core proper, has centering pins projecting from its lower face which engage in corresponding parts of the upper end of the fuel assemblies to assure that they are held in position.

During periods when the reactor is being reloaded, it is necessary to remove the upper internal equipment so as to have access to the fuel. This equipment is radioactively contaminated, and must be stored under water in the swimming pool during fuel reloading or transfer operations. A support stand is provided for this, constituted by a circular flange which rests on the bottom of the swimming pool on four feet. To allow a sufficient height of water to be provided above the upper plate and to assure radiological protection without excessively increasing the volume of the swimming pool, the support stand is located in a deeper part of the swimming pool, forming a pit of relatively small surface. In the storage position, the upper support plate of the upper internals rests on the circular flange of this stand, and the lower plate is then at a very small distance from the bottom of the deeper pit of the swimming pool.

It is particularly advantageous to use the time during which the reactor is shut down for reloading for simultaneously monitoring the upper internals in the storage position on the stand, and monitoring in particular the state of the lower face of the lower plate so as to check the state of the plate proper, the centering pieces for the assemblies, or resilient pins for the guide tubes of the control clusters. But these monitoring operations are difficult, particularly because of the small amount of space available between the lower plate and the bottom of the pit in the swimming pool, and also because of the smallness of this deeper pit. Lastly, so as not to prolong reloading operations, and consequently the time the reactor is shut down, it is necessary that the reloading machine provided to move above the swimming pool not be used too long for auxiliary operations.

The present invention provides for a self-contained machine adapted to work under the lower plate, and not necessarily requiring use of the loading machine.

SUMMARY OF THE INVENTION

The invention relates to a machine for monitoring internal equipment of a nuclear reactor, when stored in the swimming pool of the reactor, using monitoring apparatuses which must be presented at predetermined stations in accordance with a regular lattice under the lower plate of the set of equipment.

According to the invention, the machine comprises:
- a first longitudinal carriage, mounted on rails resting at the bottom of the swimming pool and disposed under the storage support of the internal equipment with means for displacement is fixed steps and for immobilization on the rails,
- a transverse beam borne by the first carriage, and movable thereon in a direction perpendicular to that of the displacement of the carriage,
- a second transverse carriage equipped with monitoring apparatuses, borne by the beam and movable thereon in the same direction as that of the displacement of the beam on the first carriage,
- means for displacement of the beam on the first carriage by fixed steps, and
- means for causing a movement of the second carriage on the beam from the movement of the beam on the first carriage.

According to a preferred embodiment of the invention, the means for causing a movement of the second carriage from the movement of the beam on the first carriage comprise a chain forming a loop by each of its ends being fixed on each of the ends of the second carriage, after reversal over two wheels solid with the ends of the beam, the portion of the loop opposite the second carriage being made solid with a fixed point connected to the chassis of the first carriage.

BRIEF DESCRIPTION OF THE DRAWINGS

The invention will be better understood by reference to a particular embodiment given by way of example and represented by the attached drawings.

FIG. 1 is a section of the swimming pool along line I—I of FIG. 2 during positioning of the machine; FIG. 2 is a plan view after the positioning operation.

DETAILED DESCRIPTION OF AN EMBODIMENT

Figure 1:
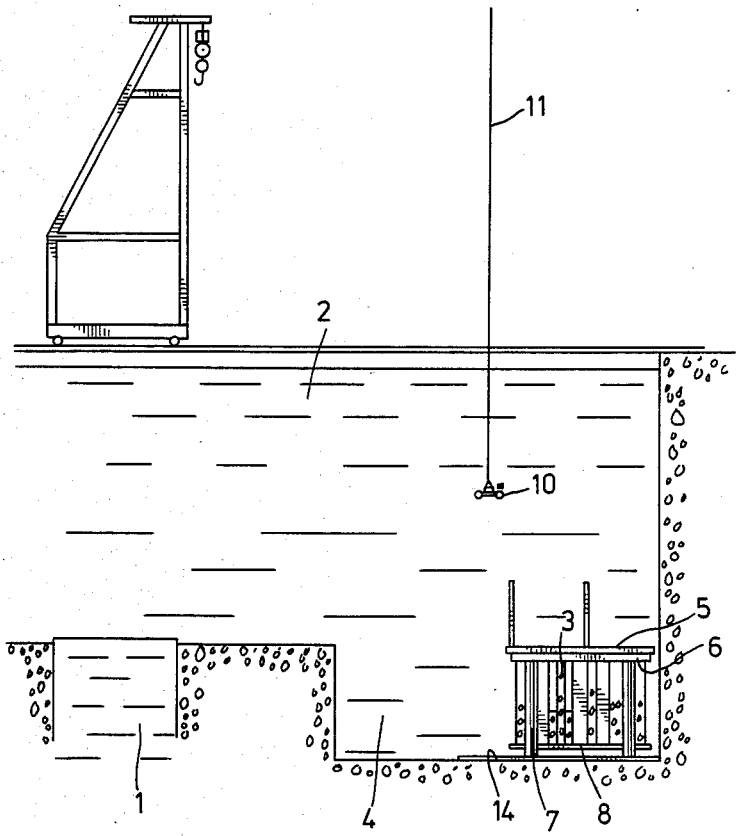
FIGS. 1 and 2 are general views which illustrate the positioning of the monitoring machine in the swimming pool of the reactor.
Figure 2:
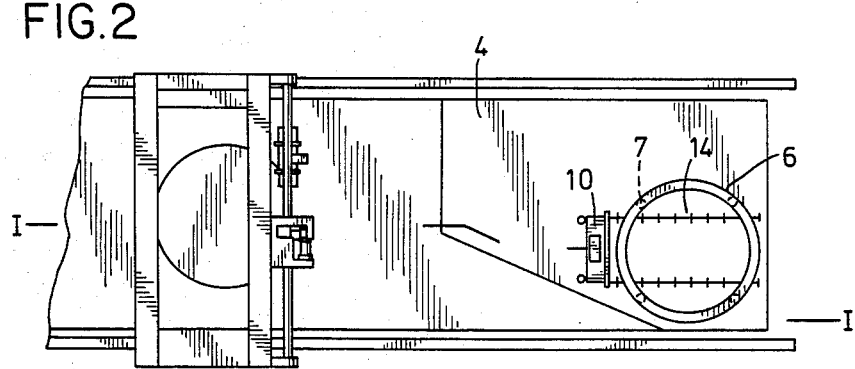

FIGS. 1 and 2 show vessel 1 of a nuclear reactor is shown, cover removed for a loading or unloading operation, and level with the bottom of the protective swimming pool 2. The upper internal equipment 3 of the vessel has been removed therefrom, and is stored in a deeper part 4, comprising a substantially trapezoidal pit, of the swimming pool 2. The internal equipment rests, by its upper plate 5, on the circular flange 6 of the support stand, which itself rests on the bottom of the pit 4 on four feet 7. To clarify FIG. 2, it has been assumed in this that the internal equipment has been removed from the stand 6,7. These figures show the small amount of space available between the bottom of the swimming pool and the lower plate 8 of the equipment, and the difficulty in introducing and positioning monitoring instruments therein, for example, ultrasonic transducers.

The machine according to the invention is shown here at 10, in a very simplified diagrammatic form. In FIG. 1, the machine 10, during introduction into the work position, is suspended from the cable 11 of a winch borne by the polar bridge of the building, or any other lifting means. In FIG. 2, the machine 10 is in position on its rails 14 at the bottom of the swimming pool.

Figure 3:
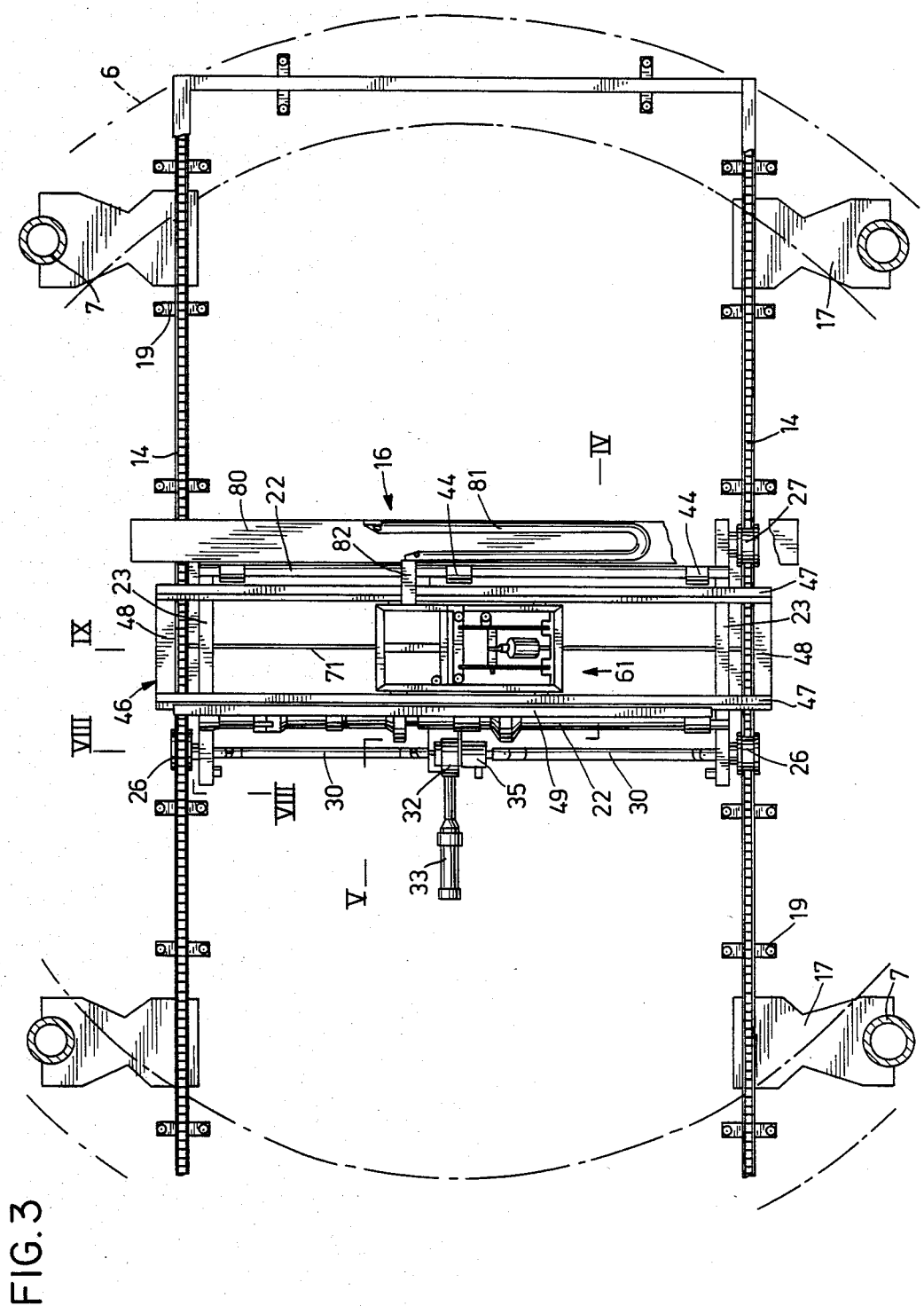
FIG. 3 represents the machine on support rails, ready to work.
Figure 4:
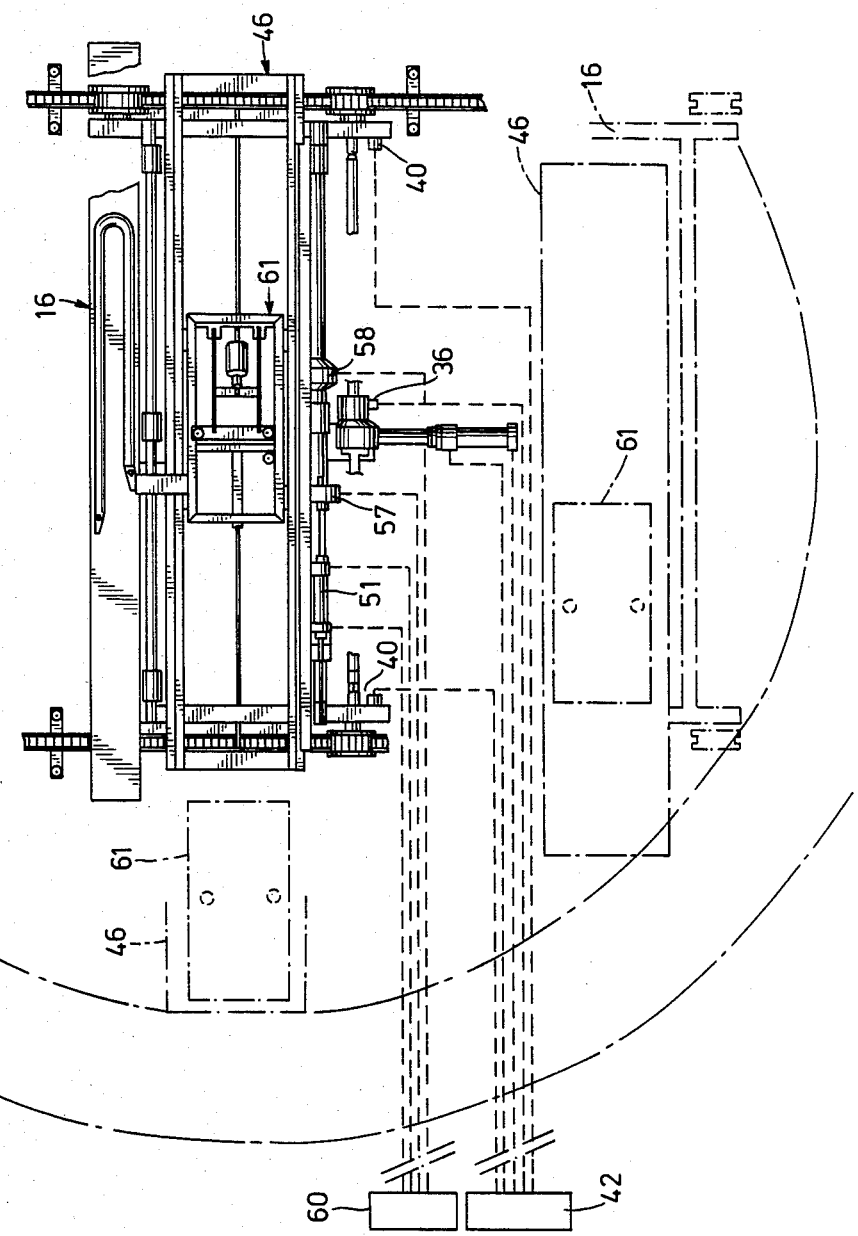
FIG. 4 partially reproduces FIG. 3, and shows in more detail the supply of the various hydraulic members, and the scope for displacment of the instrument-bearing carriage.
Figure 5:
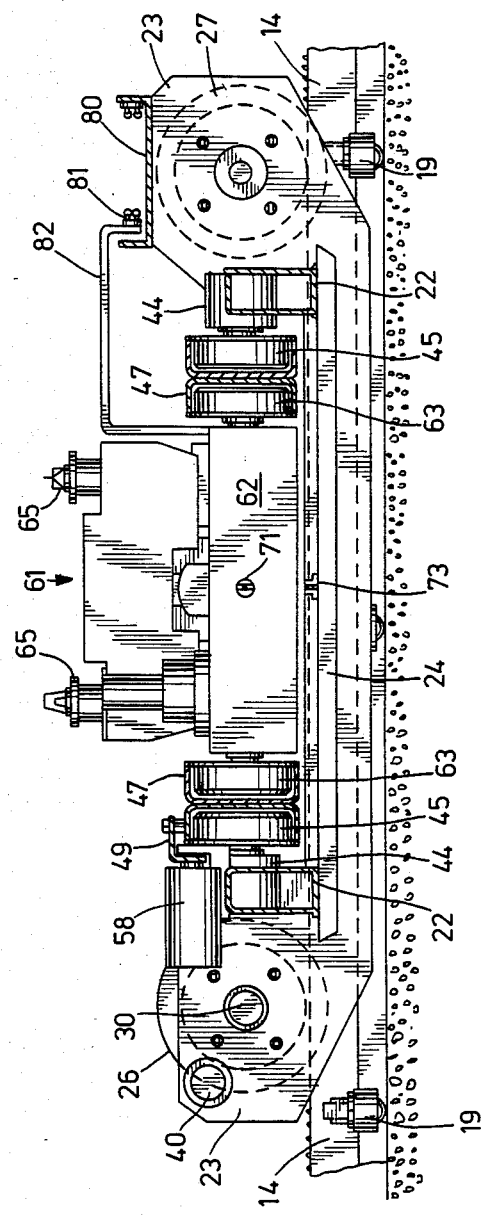
FIG. 5 is a transverse section of the machine along line V—V of FIG. 3.
Figure 7:
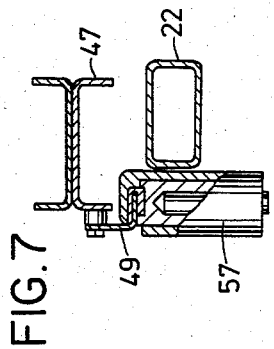
FIG. 7 is a section along line VII—VII of FIG. 6.
Figure 8:
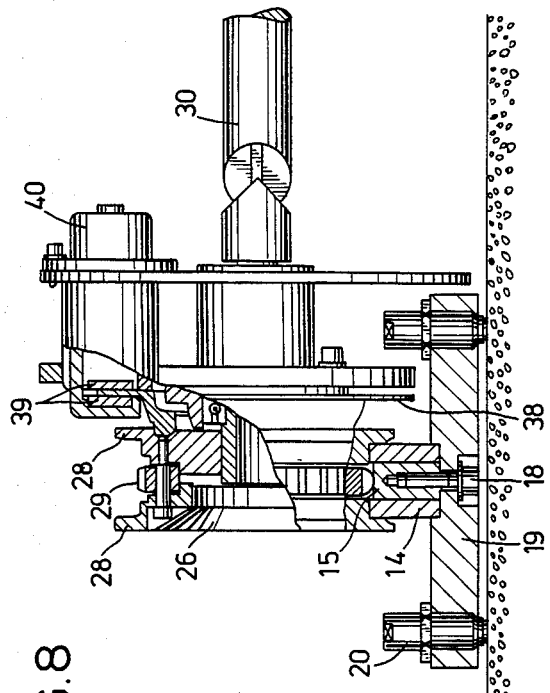
FIG. 8 is a detailed view of a displacement drive roller, along line VIII—VIII of FIG. 3.

Reference will now be made more particularly to FIGS. 3, 4 and 5, which show on a larger scale the structure of the monitoring machine 10. This is constituted by a first carriage, designated generally by 16, movable in translation on the rails 14 which are themselves positioned with respect to the feet 7 of the stand by means of spacer blocks 17. The rails 14, shown more clearly in FIG. 8, comprise a central part with a rack 15 surrounded by two smooth parts. The rails 14 are fixed by screws 18 on bearing pads 19, which are themselves levelled with respect to the bottom of the swimming pool by adjustable actuator screws 20.

The carriage 16 is constituted by two box girders 22, spaced at the ends by transverse members 23 and in the central part by ribs such as 24. The carriage 16 rests on the rails 14 via two drive rollers 26 and two carrier rollers 27. The drive rollers 26, as shown more clearly in the detail of FIG. 8, comprise two flanged wheels 28 gripping a toothed wheel 29 engaged with the central rack 15 of the rails 14. The two drive rollers 26 are driven simultaneously, via Cardan shafts 30, from a central drive unit 32 borne by the chassis of the carriage 16. The unit 32 is a rack and pinion unit driven by a double-acting hydraulic actuator 33.

The stroke of the actuator 33, in one direction and in the other, is determined as a function of the dimensions of the rack and pinion system, and as a function of the pitch diameter of the toothed wheel of the rollers 26, so that a complete stroke of the actuator corresponds to a displacement of the carriage 16 on the rails 14 equal to the pitch of the resilient pins of the cluster guides on the lower plate 8. The drive system also includes a clutch 35, controlled by an hydraulic actuator 36, allowing positive driving of the Cardan shafts 30 by the rack and pinion system 32, or conversely a neutral return stroke of the actuator 33 without driving the carriage along. It will also be seen (FIG. 8) that each drive roller 26 is provided with a disc brake constituted by a disc 38 which passes between the fixed and movable jaws 39 of an hydraulic braking actuator 40.

The carrier rollers 27, not having a toothed wheel, only bear on the smooth side members of the rails.

The hydraulic supply for the two inlets of the drive actuator 33, the selective clutch 35 and the two brakes 40 is represented diagrammatically in FIG. 4, and is controlled by a distributor unit 42; depending on the direction required for the displacement of the carriage 16, the actuator 36 of the clutch 35 is actuated at the same time as one or other of the inlets of the acutator 33 is supplied, and in addition the rollers 26 are immobilized by the action of the braking actuators 40 as soon as disengagement is effected by the actuator 36.

With more particular reference to FIGS. 3 and 5, it will be seen that on each beam 22 of the carriage 16 three shaft bearings 44 are welded for idler rollers 45 cantilevered inwardly of the carriage. The rollers 45 serve as rolling tracks for a transverse beam designated generally by 46, and constituted by two I beams 47 spaced at each end by a transverse member 48. One of the beams 47 supports a cantilevered angle iron 49.

Transverse displacement of the beam 46 on the carriage 16 is assured by a double-acting hydraulic actuator 51 whose body is articulated at 52 on a support 53 fixed to the beam 22. The end of the rod 54 of the actuator 51 is supported by an idler roller 55 rolling freely on the upper face of the beam 22. The rod 54 also supports an hydraulic braking actuator 57 whose jaws grip the free wing of the angle iron 49. This same wing of the angle iron 49 is also taken between the jaws of another hydraulic braking actuator 58 directly fixed on the beam 22.

The hydraulic supply for the two inlets of the drive actuator 51, the movable braking actuator 57 and the fixed braking actuator 58 is also represented diagrammatically in FIG. 4 and is controlled by a distributor unit 60. Depending on the direction required for the displacement of the beam 46, gripping of the actuator 57 is caused and the immobilization actuator 58 is released at the same time as the actuator 51 is supplied via the required inlet; during the return stroke, therefore, with the actuator 57 released and the actuator 58 in its gripping condition, no movement is transmitted to the beam 46.

Figure 10:
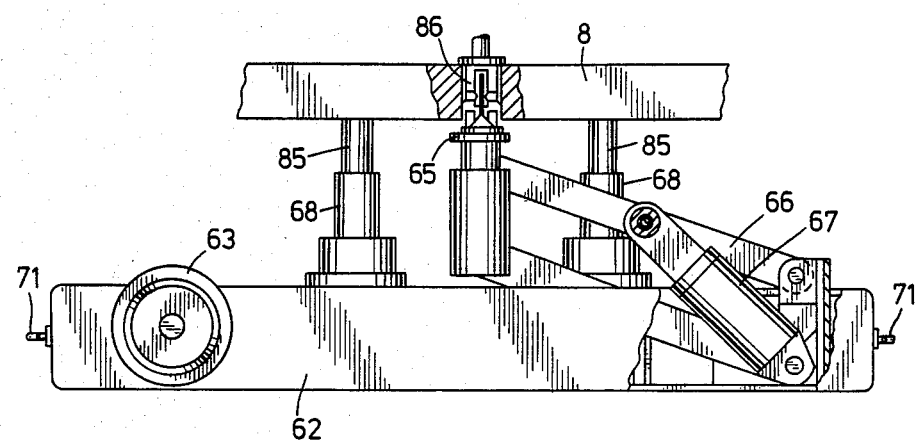
FIGS. 10 and 11 represent, respectively in side elevation with partial section and in plan view, the instrument-bearing carriage proper, separate from the rest of the machine.
Figure 11:
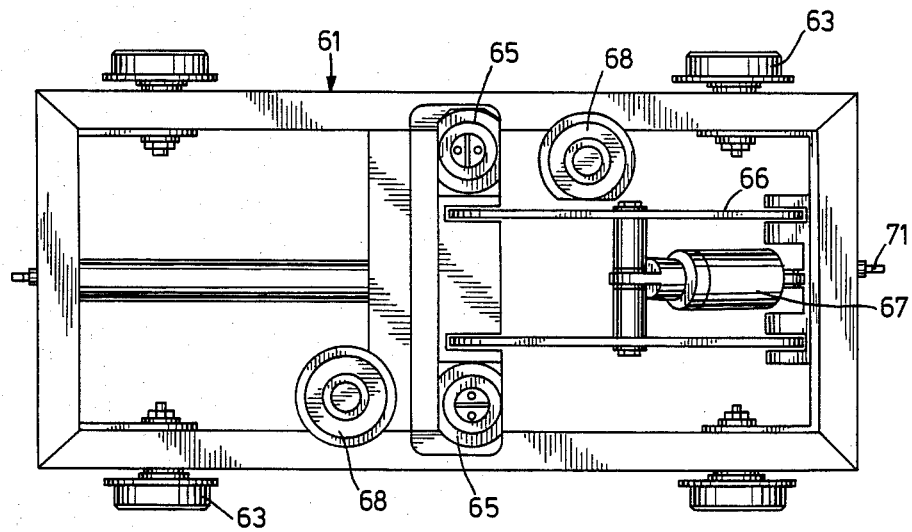

The bearing carriage for the monitoring apparatuses proper, designated generally by 61, is represented in more detail in FIGS. 10 and 11 as if separate from the rest of the machine. Conversely, in FIGS. 3 and 5, it is shown in position on the rest of the support machine. The carriage 61 is constituted by a rectangular chassis 62 provided with four idler-carrier rollers 63. The rollers 63 are engaged and trapped within the inner wings of the beams 47 of the beam 46.

The monitoring apparatuses which are here represented by ultrasonic transducers 65, are mounted in pairs on an articulated parallelogram system 66, deformable under the action of the actuator 67. The carriage 61 also bears two centering actuators 68.

Figure 9:
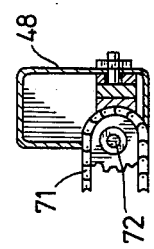
FIG. 9 is a section along line IX—IX of FIG. 3.
Figure 6:
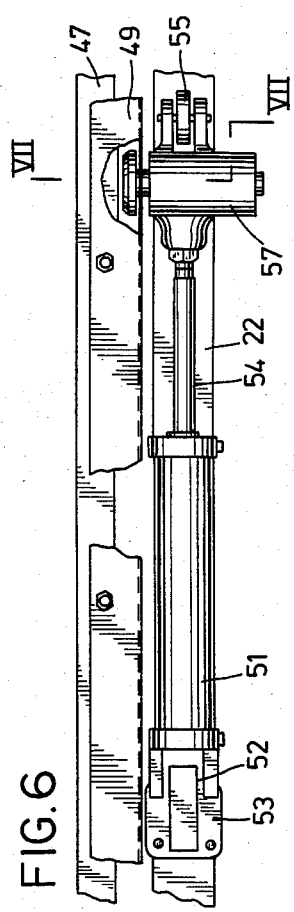
FIG. 6 is a plan view of the actuator for displacing the beam.

The carriage 61 is set in movement with respect to the beam 46 by means of a chain 71, each end of which is fixed to the end of the chassis 62 of the carriage. Thus looped, the chain passes over two reversing wheels 72 borne respectively by each of the transverse end members 48 of the carriage 46, as shown in FIG. 9. In addition, the chain 71 is made solid, by an element of the lower portion of the loop, with a fixed point 73 borne by one transverse member of the carriage 16.

The electrical supply cables of the ultrasonic transducers reach the longitudinal carriage 16 at the center of a channel 80 connecting the two end spacers 23 of the chassis 16. The channel 80 serves as support for a trailing loop 81 of cable whose movable end is fixed to a sensor 82 solid with the carriage 62 and movable with it.

To carry out monitoring of the lower face of the plate 8 in its waiting position on the stand 6,7, and in particular to monitor the state of the resilient pins which end there, the machine is first lowered on its rails 14 over the region covered by the flange 6, all the electrical and hydraulic supply cables or lines being already connected to the machine 10. All subsequent monitoring operations are then carried out in time which is masked by the other operations of loading or unloading the core.

The whole of the machine is first set in its reference position by bringing the carriage up to stops accurately positioned at the end of the rails 14. The carriage 16 is brought into the required longitudinal position, by a succession of cycles consisting of operation of the actuator 33, stopping of the rollers 26, and disengagement and return by the actuator, the cyclic operations being easily automatable by a programmer. The beam 46 and more particularly the instrument-bearing carriage 61 are brought into the required transverse position by a succession of cycles consisting of operation of the actuator 31, locking of the brake 58, releasing of the actuator 57 and returning of the actuator, the cyclic operations being here also easily automatable by a programmer. It will be noted that in transverse movement the chain system 71 acts as multiplier, since for each stroke of the actuator 51 the carriage 62 moves with respect to the beam 36 by the same distance as the beam 46 moves with respect to the carriage 61, i.e., in short the total transverse movement of the carriage 61 is double the stroke of the actuator 51.

When the carriage 61 is brought into a suitable position, the centering actuators 61 are supplied and then engage on the centering pins 85 projecting below the plate 8. When positioning has been very accurately assured, the instruments 65 can be brought into contact with the pins 86 to be monitored by operating the actuator 67. After the two resilient pins of a guide tube have been checked, the instrument-bearing carriage 61 can be moved by one step in one direction or another so that the next guide tube can be examined in the same way.

It will be noted that the machine constitutes a unit which is particularly compact and of very small overall height, and is easily brought under the plate 8, but which still allows the whole of the lower surface of this plate to be scanned. FIG. 4 represents in simple outline in chain-dotted lines two off center positions of the instrument-bearing carriage 61.

The invention is not limited to the embodiment described by way of example; it also covers embodiments which differ only in detail, variants of execution, or the use of equivalent means. Thus, depending on the nature of the monitoring instruments to be disposed on the instrument-bearing carriage, the apparatus for directly supporting these instruments can be modified, and the parallelogram apparatus can even be omitted if the instruments are able to work at a certain distance from the plate.

We claim:

1. Machine for monitoring internal equipment of a nuclear reactor, when stored in the swimming pool of said reactor, by using monitoring apparatuses to be presented at predetermined stations in accordance with a regular lattice under a lower plate of said equipment, comprising
   (a) a first longitudinal carriage (16), movable on rails (14) resting at the bottom of said swimming pool and disposed under a support (6, 7) for storing said equipment, with means (26,32,33) for displacement in predetermined steps and immobilization on said rails;
   (b) a transverse beam (46) borne by said first carriage (16) and movable thereon in a direction perpendicular to that of the displacement direction of said first carriage (16);
   (c) a second transverse carriage (61) equipped with monitoring apparatuses (65) borne by said beam (46) and movable thereon in the same direction as that of the displacement of said beam (46) on said first carriage (16);
   (d) means (51, 57, 58) for displacement by fixed steps of said beam (46) on said first carriage (16); and
   (e) means (71, 72, 73) for causing movement of said second carriage (61) on said beam (46) from the movement of said beam (46) on said first carriage (16), said means comprising a chain (71) forming a loop by each of its ends being fixed on each end of said second carriage (61), after reversal on two wheels (72) solid with the ends (48) of said beam, the portion of said loop opposite said second carriage (61) being made solid with a fixed point (73) connected to the chassis of said first carriage (16);
   (f) the displacements of said first carriage (16) on said rails (14), said transverse beam (46) on said first carriage (16) and said second carriage (61) on said beam (46) all being carried out in substantially the same horizontal plane.

2. Machine according to claim 1, wherein displacement of said first carriage (16) on its rails (14) in predetermined steps is assured by means of drive rollers (26) with toothed wheels (29) combined with a rack (15) connected to said rails (14), from the fixed stroke of a hydraulic actuator (33) driving said rollers (26) via a rack and pinion system (32) and a clutch (35) coupled with a brake (39, 40) for said rollers, the displacement of said beam (46) on said first carriage (16) in predetermined steps being assured from the fixed stroke of an hydraulic actuator (51) borne by said first carriage (16) and driving an element (49) solid with said beam (46) via a gripper provided with a gripping and releasing system (57) coupled to that (58) of a similar gripper for immobilizing said beam (46) on said first carriage (16).

* * * * *